(12) United States Patent
Nakayama (10) Patent No.: US 12,091,089 B2
(45) Date of Patent: Sep. 17, 2024

(54) ELECTRIC WORK VEHICLE INCLUDING BATTERY ENCLOSURE STRUCTURE

(71) Applicant: KUBOTA CORPORATION, Osaka (JP)

(72) Inventor: Daisuke Nakayama, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 255 days.

(21) Appl. No.: 17/619,531

(22) PCT Filed: May 27, 2020

(86) PCT No.: PCT/JP2020/020876
§ 371 (c)(1),
(2) Date: Dec. 15, 2021

(87) PCT Pub. No.: WO2020/261849
PCT Pub. Date: Dec. 30, 2020

(65) Prior Publication Data
US 2022/0379970 A1    Dec. 1, 2022

(30) Foreign Application Priority Data

Jun. 24, 2019   (JP) .................... 2019-116726

(51) Int. Cl.
*B60K 1/04*       (2019.01)
*B60L 50/60*     (2019.01)
(Continued)

(52) U.S. Cl.
CPC ............... *B62D 25/10* (2013.01); *B60K 1/04* (2013.01); *B60L 50/60* (2019.02);
(Continued)

(58) Field of Classification Search
CPC ...... B62D 25/10; B62D 33/0625; B60K 1/04; B60K 2001/0411; B60L 50/60; B60L 2200/40
See application file for complete search history.

(56) References Cited

U.S. PATENT DOCUMENTS 5,651,164 A * 7/1997 DeMarco .............. E05D 15/502
                                                         16/233
9,139,122 B2 * 9/2015 Esparza ................ B60P 1/5495
(Continued)

FOREIGN PATENT DOCUMENTS

CN      205800763 U    12/2016
JP         60-99177 U      7/1985
(Continued)

OTHER PUBLICATIONS

Official Communication issued in International Patent Application No. PCT/JP2020/020876, mailed on Aug. 11, 2020.
(Continued)

*Primary Examiner* — Jason D Shanske
*Assistant Examiner* — James J Triggs
(74) *Attorney, Agent, or Firm* — Keating & Bennett, LLP (57) ABSTRACT

An electric work vehicle includes a driver section that an operator is able to enter, a battery positioned forward of the driver section, a motor drivable on electric power supplied by the battery, a travel device drivable by the motor, a cover including an accommodation space inside and capable of being opened and closed, wherein the battery includes an electricity storage to store electric power and a battery cover hermetically accommodating the electricity storage, and the battery cover includes an outer wall surface defining a portion of an exterior of the electric work vehicle.

8 Claims, 4 Drawing Sheets

(51) Int. Cl.
*B62D 25/10* (2006.01)
*B62D 33/06* (2006.01)
*B62D 49/06* (2006.01)

(52) U.S. Cl.
CPC .. *B62D 33/0625* (2013.01); *B60K 2001/0411* (2013.01); *B60L 2200/40* (2013.01); *B62D 49/06* (2013.01)

(56) References Cited

U.S. PATENT DOCUMENTS

2008/0129079 A1* 6/2008 Plett ................. B62D 25/24
                                              296/146.5
2011/0108338 A1* 5/2011 Uno .................. B62D 33/0625
                                              180/65.1

FOREIGN PATENT DOCUMENTS

| JP | 2011-127473 A | 6/2011 |
| JP | 2011254843 A | 12/2011 |
| JP | 2013-177119 A | 9/2013 |
| JP | 2013-248918 A | 12/2013 |
| JP | 2017-007608 A | 1/2017 |
| JP | 2017-177934 A | 10/2017 |
| JP | 2018-069926 A | 5/2018 |

OTHER PUBLICATIONS

Official Communication issued in corresponding Indian Patent Application No. 202117054613, mailed on Jun. 24, 2022.
Official Communication issued in corresponding Chinese Patent Application No. 202080038603.4, mailed on Jul. 10, 2024.

* cited by examiner

ELECTRIC WORK VEHICLE INCLUDING BATTERY ENCLOSURE STRUCTURE

BACKGROUND OF THE INVENTION

1. Field of the Invention

The present invention relates to an electric work vehicle including a battery, a motor drivable on electric power supplied by the battery, and a travel device drivable by the motor.

2. Description of the Related Art

JP2018-69926A discloses a work vehicle ("tractor" in JP2018-69926A) including an engine and a travel device drivable by the engine ("front wheels" and "rear wheels" in JP2018-69926A).

SUMMARY OF THE INVENTION

The work vehicle disclosed in JP2018-69926A may be modified by replacing the engine with a battery and a motor. This will allow the work vehicle to travel without discharging exhaust gas.

The work vehicle disclosed in JP2018-69926A may also be modified by including a cover having an accommodation space inside and capable of being opened and closed, the cover being capable of accommodating the battery.

A work vehicle drivable on electric power from a battery can travel over a longer distance when the battery has a larger capacity for storage of electricity. A battery with a relatively large capacity for electricity storage allows a work vehicle to travel over a relatively long distance.

A battery with a larger capacity for electricity storage, however, tends to be larger in size.

Since the battery is accommodated by the cover, a relatively small cover will only allow use of a relatively small battery. Such a battery will have a relatively small capacity for electricity storage. This can make it impossible for a work vehicle to travel over a required distance.

Preferred embodiments of the present invention provide electric work vehicles that can each include a relatively large battery.

A preferred embodiment of the present invention includes a driver section that an operator is able to enter, a battery positioned forward of the driver section, a motor drivable on electric power supplied by the battery, a travel device drivable by the motor, and a cover including an accommodation space inside and capable of being opened and closed, wherein the battery includes an electricity storage to store electric power, and a battery cover hermetically accommodating the electricity storage, and the battery cover includes an outer wall surface as part of an exterior of the electric work vehicle.

With a preferred embodiment of the present invention, the battery is not accommodated by the cover. This allows a relatively large battery to be included, regardless of the size of the cover.

A preferred embodiment of the present invention therefore allows production of an electric work vehicle that can include a relatively large battery.

A preferred embodiment of the present invention may preferably be further arranged such that the cover is adjacent to the battery, and the cover includes an end portion facing the battery cover which end portion has an outer shape continuous with an outer shape of an end portion of the battery cover which end portion faces the cover.

The above configuration allows the cover and the battery cover to have respective outer shapes that are smoothly connected to each other. This allows the electric work vehicle to have an outer shape that is smooth at a portion extending over the cover and the battery cover.

A preferred embodiment of the present invention may preferably be further arranged such that the cover is held by the battery cover.

The above configuration eliminates the need to include a dedicated member for holding the cover, and thereby reduces the production cost as compared to a case of including a dedicated member for holding the cover.

A preferred embodiment of the present invention may preferably be further arranged such that the cover is swingable about a swing axis extending in a left-right direction of a machine body to be opened and closed.

For instance, a cover swingable about a swing axis extending in the up-down direction of the machine body to be opened and closed is swung in the left-right direction. Thus, an obstacle such as a building wall or crops to the left or right of the machine body can prevent the cover from becoming open.

With the above configuration, the cover is swingable in the up-down direction. Thus, an obstacle to the left or right of the machine body will not prevent the cover from becoming open.

The above configuration, in other words, allows production of an electric work vehicle including a cover that is not prevented from becoming open by an obstacle to the left or right of the machine body.

A preferred embodiment of the present invention may preferably be further arranged such that the cover is swingable about a swing axis extending in an up-down direction of a machine body to be opened and closed.

For instance, a cover swingable about a swing axis extending in the left-right direction of the machine body to be opened and closed is swung in the up-down direction. Thus, an obstacle such as a building ceiling over the machine body or a building floor or crops under the machine body can prevent the cover from becoming open.

With the above configuration, the cover is swingable in the left-right direction. Thus, an obstacle over or under the machine body will not prevent the cover from becoming open.

The above configuration, in other words, allows production of an electric work vehicle including a cover that is not prevented from becoming open by an obstacle over or under the machine body.

A preferred embodiment of the present invention may preferably be further arranged such that the cover is slidable relative to the battery cover to be opened and closed.

With the above configuration, an obstacle around the machine body will not prevent the cover from becoming open as long as the obstacle is in a direction from the cover which direction is other than the direction in which the cover is moved to become open.

In a case where, for instance, the cover is moved forward to become open, an obstacle will not prevent the cover from becoming open if the obstacle is to the left of, to the right of, over, under, or backward of the cover.

The above configuration, in other words, allows production of an electric work vehicle including a cover that is not prevented from becoming open by an obstacle around the machine body.

A preferred embodiment of the present invention may preferably be further arranged such that the battery cover includes an inspection opening allowing communication between an inside and outside of the battery cover, and includes an inspection opening cover capable of exposing and closing the inspection opening.

With the above configuration, exposing the inspection opening allows a person to easily reach the inside of the battery cover. This in turn allows the battery to be maintained easily.

A preferred embodiment of the present invention may preferably be further arranged such that the battery cover includes a left side wall and a right side wall, and the left side wall and the right side wall are oriented vertically, and are parallel to each other in a plan view.

With the above configuration, in a case where the electricity storage has an outer shape of a rectangular parallelepiped or a cube, the battery cover is capable of accommodating the electricity storage with a relatively small gap between the electricity storage and the respective inner surfaces of the left and right side walls of the battery cover. The above configuration, in other words, allows a large proportion of the space inside the battery cover to be used for the electricity storage.

The above configuration thus allows the battery cover to accommodate a large-sized electricity storage, thus allowing production of an electric work vehicle that can include a relatively large electricity storage.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

The description below describes preferred embodiments of the present invention with reference to drawings. The description below uses terms such as "front" and "forward" to refer to the direction indicated with arrow F in FIGS. 1 to 5, terms such as "back" and "backward" to refer to the direction indicated with arrow B in the same drawings, terms such as "left" and "leftward" to refer to the direction indicated with arrow L in FIGS. 3 to 5, terms such as "right" and "rightward" to refer to the direction indicated with arrow R in the same drawings, terms such as "above" and "upward" to refer to the direction indicated with arrow U in FIGS. 1 and 2, and terms such as "below" and "downward" to refer to the direction indicated with arrow D in the same drawings.

Figure 1:
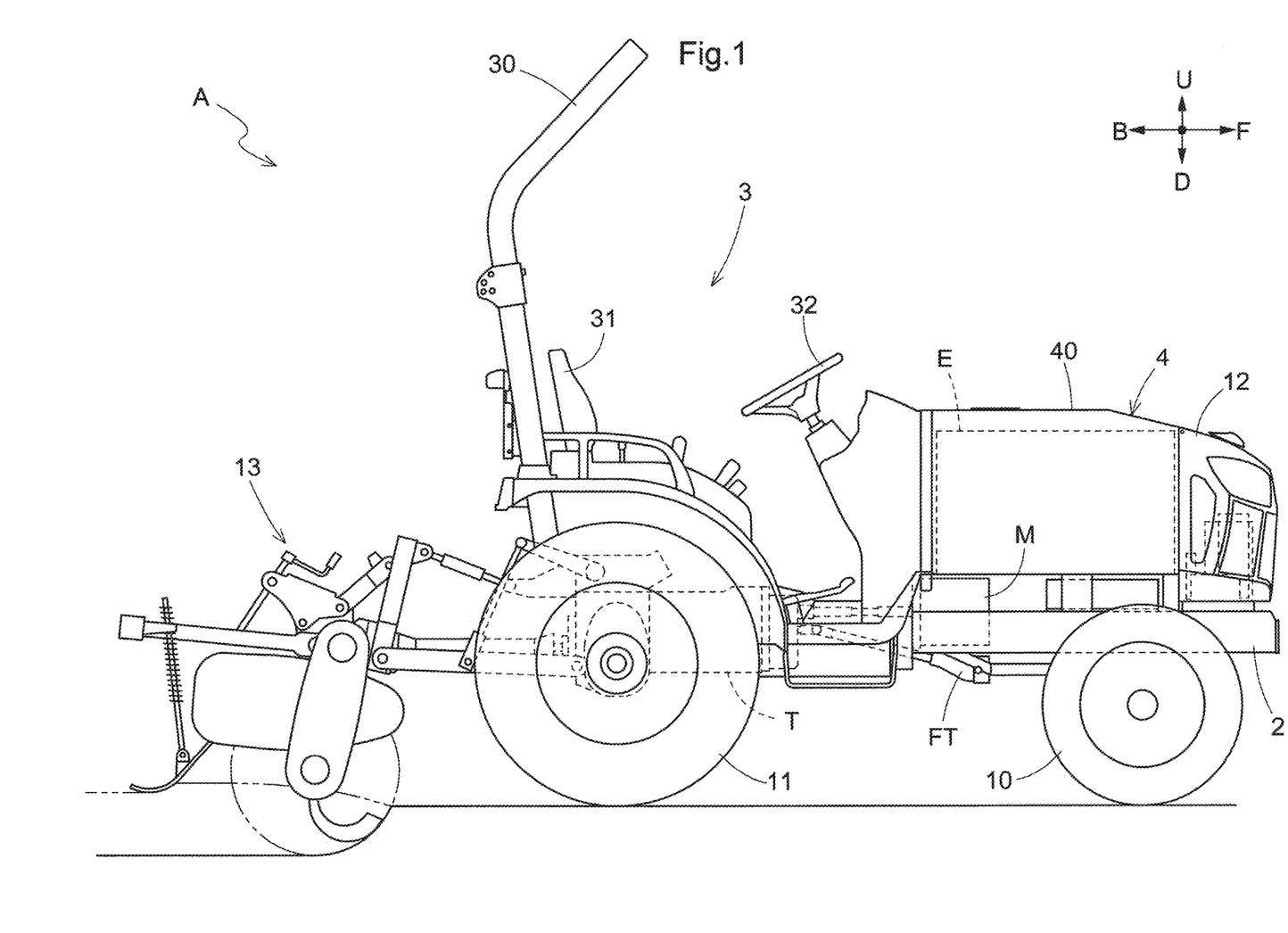
FIG. 1 is a right side view of a tractor.

FIG. 1 illustrates a tractor A (as an example of the "electric work vehicle") including left and right front wheels 10 (as an example of the "travel device"), left and right rear wheels 11 (as an example of the "travel device"), a cover 12, and a tiller device 13.

The tractor A further includes a body frame 2 and a driver section 3.

The body frame 2 is supported by the left and right front wheels 10 and the left and right rear wheels 11. The tiller device 13 is supported by a back portion of the body frame 2.

The cover 12 is at a front portion of the machine body. The driver section 3 is behind the cover 12.

The driver section 3 includes a protection frame 30, a driver's seat 31, and a steering wheel 32. An operator can enter the driver section 3, sit on the driver's seat 31, and perform various drive operations in the driver section 3.

The tractor A, in other words, includes a driver section 3 that an operator is able to enter.

Operating the steering wheel 32 changes the direction of the left and right front wheels 10.

The tractor A further includes a travel battery 4 (as an example of the "battery"), a motor M, a transmission device T, and a front transmission mechanism FT.

The travel battery 4 is forward of the driver section 3. The tractor A, in other words, includes a travel battery 4 forward of the driver section 3.

The travel battery 4 supplies electric power to the motor M.

Figure 2:
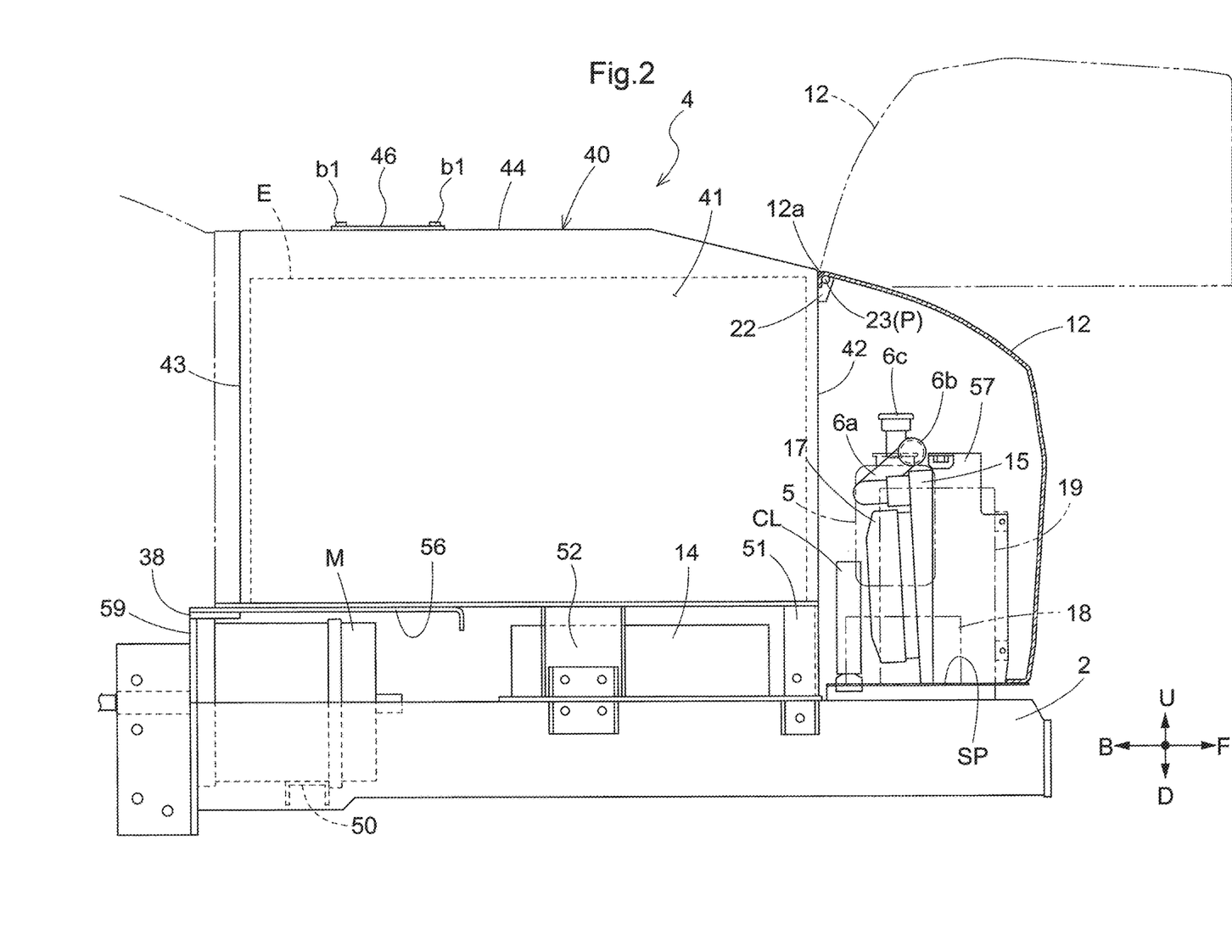
FIG. 2 is a right side view of a travel battery and a cover with a portion broken away.
Figure 3:
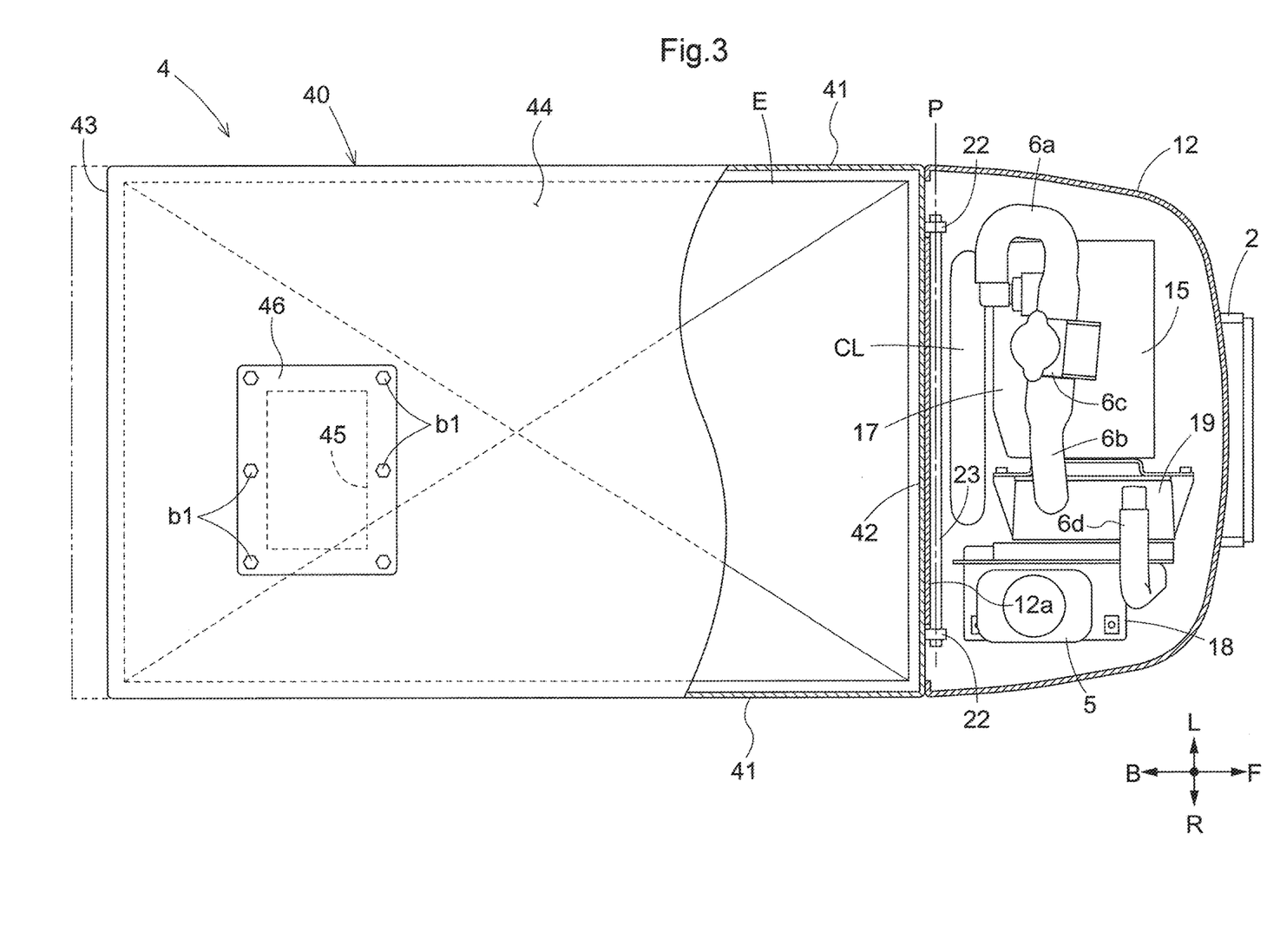
FIG. 3 is a plan view of a travel battery and a cover with a portion broken away.

As illustrated in FIGS. 1 to 3, the cover 12 is forward of and adjacent to the travel battery 4, and has an accommodation space inside.

The cover 12 is swingable about a swing axis P extending in the left-right direction of the machine body to be opened and closed.

The tractor A, in other words, includes a cover 12 adjacent to the travel battery 4, capable of being opened and closed, and having an accommodation space inside. The cover 12 is also swingable about a swing axis P extending in the left-right direction of the machine body to be opened and closed.

The motor M is under the travel battery 4 and is held in place by a front portion support frame 50 and a back portion support frame 59. The motor M is driven on electric power supplied by the travel battery 4, and transmits its driving force to the transmission device T.

The transmission device T is backward of the travel battery 4 and behind the motor M. The front transmission mechanism FT extends forward from the transmission device T. The transmission device T varies the driving force received from the motor M, and transmits the resulting driving force to the left and right rear wheels 11 as well as to the left and right front wheels 10 via the front transmission mechanism FT. This drives the left and right front wheels 10 and the left and right rear wheels 11.

The tractor A, in other words, includes a motor M drivable on electric power supplied by the travel battery 4. The tractor A also includes left and right front wheels 10 and left and right rear wheels 11 drivable by the motor M.

The transmission device T transmits a portion of the driving force received from the motor M to the tiller device 13. This drives the tiller device 13.

The above configuration allows the tractor A to travel with use of the left and right front wheels 10 and the left and right rear wheels 11 and simultaneously perform tillage work with use of the tiller device 13.

As illustrated in FIG. 2, the tractor A further includes an inverter 14 under the travel battery 4.

The inverter 14 converts direct-current electric power from the travel battery 4 into alternating-current electric power, and supplies the alternating-current electric power to the motor M.

As illustrated in FIG. 2, the tractor A includes left and right first support frames 51 and left and right second support frames 52.

The left and right first support frames 51 are forward of the left and right second support frames 52. The left and right first support frames 51 and the left and right second support frames 52 all stand on the body frame 2.

The tractor A further includes a plate-shaped support 38 and a plate-shaped partition member 56 between the motor M and the travel battery 4. The plate-shaped support 38 and the plate-shaped partition member 56 are each oriented horizontally. The plate-shaped partition member 56 extends over the plate-shaped support 38.

The tractor A further includes a back portion support frame 59 supported by the body frame 2. The back portion support frame 59 supports a back end portion of the travel battery 4 with the plate-shaped support 38 and the plate-shaped partition member 56 in-between.

The travel battery 4 is supported by the left and right first support frames 51, the left and right second support frames 52, and the back portion support frame 59.

As illustrated in FIGS. 2 and 3, the tractor A includes a radiator 15 forward of the travel battery 4.

The radiator 15 is included in a cooling water path of the tractor A. A water pump (not shown in the drawings) forces cooling water to circulate through the cooling water path. The cooling water is cooled by the radiator 15 as it passes therethrough.

The tractor A further includes a cooling fan 17. The cooling fan 17 is in front of the travel battery 4.

When the cover 12 is in the closed state, the radiator 15 and the cooling fan 17 are accommodated in the cover 12. The radiator 15 is cooled by the cooling fan 17.

As illustrated in FIGS. 2 and 3, the tractor A includes a reserve tank 5 for the radiator 15. The reserve tank 5 stores cooling water.

The tractor A also includes an auxiliary battery 18 and a voltage converter 19. The auxiliary battery 18 supplies electric power to various auxiliaries such as the cooling fan 17.

The travel battery 4 transmits electric power to the voltage converter 19, which then steps down the voltage of the electric power and supplies the resulting electric power to the auxiliary battery 18.

As illustrated in FIGS. 2 and 3, the tractor A includes an oil cooler CL. The oil cooler CL cools operating oil of the tractor A as it passes through the oil cooler CL.

The radiator 15 is held in place by a radiator frame 57 in the shape of an angular arch. The radiator frame 57 surrounds the radiator 15.

The tractor A includes a first hose 6a, a second hose 6b, a water supply section 6c, and a third hose 6d, which are included in the cooling water path of the tractor A.

The first hose 6a includes a first end connected to the radiator 15 and a second end connected to the water supply section 6c.

The second hose 6b includes a first end connected to the water supply section 6c and a second end connected to the voltage converter 19.

The third hose 6d is connected to the voltage converter 19.

An operator can supply cooling water into the water supply section 6c. The cooling water flows sequentially through the third hose 6d, the voltage converter 19, the second hose 6b, the water supply section 6c, the first hose 6a, and the radiator 15.

The cover 12, in the closed state, accommodates the voltage converter 19, the radiator frame 57, the reserve tank 5, and the auxiliary battery 18.

As illustrated in FIG. 2, the tractor A includes a horizontally oriented support plate SP at a front portion thereof. The support plate SP supports the radiator 15, the cooling fan 17, the auxiliary battery 18, the voltage converter 19, and the oil cooler CL.

As illustrated in FIGS. 2 and 3, the travel battery 4 includes an electricity storage E and a battery cover 40.

The electricity storage E stores electric power. The battery cover 40 hermetically accommodates the electricity storage E. The electricity storage E has an outer shape of a rectangular parallelepiped.

The travel battery 4, in other words, includes an electricity storage E to store electric power and a battery cover 40 hermetically accommodating the electricity storage E.

The battery cover 40 includes left and right side walls 41, a front wall 42, a back wall 43, and a top wall 44. The electricity storage E is surrounded by the left and right side walls 41, the front wall 42, the back wall 43, and the top wall 44.

The battery cover 40, in other words, includes left and right side walls 41.

The left and right side walls 41 and the top wall 44 each have an outer wall surface as a portion of the exterior of the tractor A. In other words, the battery cover 40 includes an outer wall surface as a portion of the exterior.

As illustrated in FIGS. 2 and 3, the left and right side walls 41 are oriented vertically and parallel to each other in a plan view.

As illustrated in FIGS. 1 to 3, the cover 12 includes a back end portion with an outer shape continuous with the outer shape of a front end portion of the battery cover 40. Specifically, the respective outer shapes of the back end portion of the cover 12 and the front end portion of the battery cover 40 are both rectangular in a front view.

The back end portion of the cover 12 refers to that end portion of the cover 12 which faces the battery cover 40. The front end portion of the battery cover 40 refers to that end portion of the battery cover 40 which faces the cover 12.

In other words, the cover 12 includes an end portion facing the battery cover 40 which end portion has an outer shape continuous with the outer shape of an end portion of the battery cover 40 which faces the cover 12.

As illustrated in FIGS. 2 and 3, the battery cover 40 includes left and right shaft supports 22 fixed to an upper end portion of the outer wall surface of the front wall 42, and also includes a support shaft 23 extending through the left and right shaft supports 22.

The support shaft 23 is a bar-shaped member extending in the left-right direction of the machine body, and is supported by the left and right shaft supports 22.

The cover 12 includes, at an upper back end thereof, an engagement section 12a including a downward bend portion. The engagement section 12a is engaged with the support shaft 23, so that the cover 12 is supported by the support shaft 23 in such a manner as to be swingable about the swing axis P.

With the configuration described above, the cover 12 is held by the front wall 42 with the support shaft 23 and the left and right shaft supports 22 in-between. The cover 12 is, in other words, held by the battery cover 40.

As illustrated in FIGS. 2 and 3, the battery cover 40 includes an inspection opening 45, and includes an inspection opening cover 46. The inspection opening 45 is in the top wall 44, and allows communication between the inside and outside of the battery cover 40.

The inspection opening cover 46 is detachably attached to the top wall 44 to close the inspection opening 45. Detaching the inspection opening cover 46 exposes the inspection opening 45. Attaching the inspection opening cover 46 closes the inspection opening 45.

Specifically, the inspection opening cover 46 is attached to the top wall 44 with use of a plurality of bolts b1. Removing the plurality of bolts b1 allows the inspection opening cover 46 to be detached. Preferred embodiments of the present invention are, however, not limited to such an arrangement. The inspection opening cover 46 may alternatively be attached to the top wall 44 with use of a single bolt b1.

With the above configuration, the inspection opening cover 46 allows the inspection opening 45 to be exposed or closed.

In other words, the battery cover 40 includes an inspection opening 45 allowing communication between the inside and outside of the battery cover 40, and includes an inspection opening cover 46 capable of exposing and closing the inspection opening 45.

With the configuration described above, the travel battery 4 is not accommodated by the cover 12. This allows a relatively large travel battery 4 to be included, regardless of the size of the cover 12.

The configuration described above therefore allows production of a tractor A that can include a relatively large travel battery 4.

The preferred embodiments described above are mere examples. Preferred embodiments of the present invention are not limited thereto, and may be altered as appropriate.

Alternative Preferred Embodiments

The electricity storage E does not necessarily have an outer shape of a rectangular parallelepiped. The electricity storage E may have another outer shape such as a cuboid.

The inspection opening cover 46 may be attached to the top wall 44 without use of the bolts b1. For instance, a preferred embodiment of the present invention may be arranged such that the inspection opening cover 46 has a protrusion, whereas the top wall has a depression and that fitting the protrusion into the depression causes the inspection opening cover 46 to be attached to the top wall 44.

Figures 4, 5:
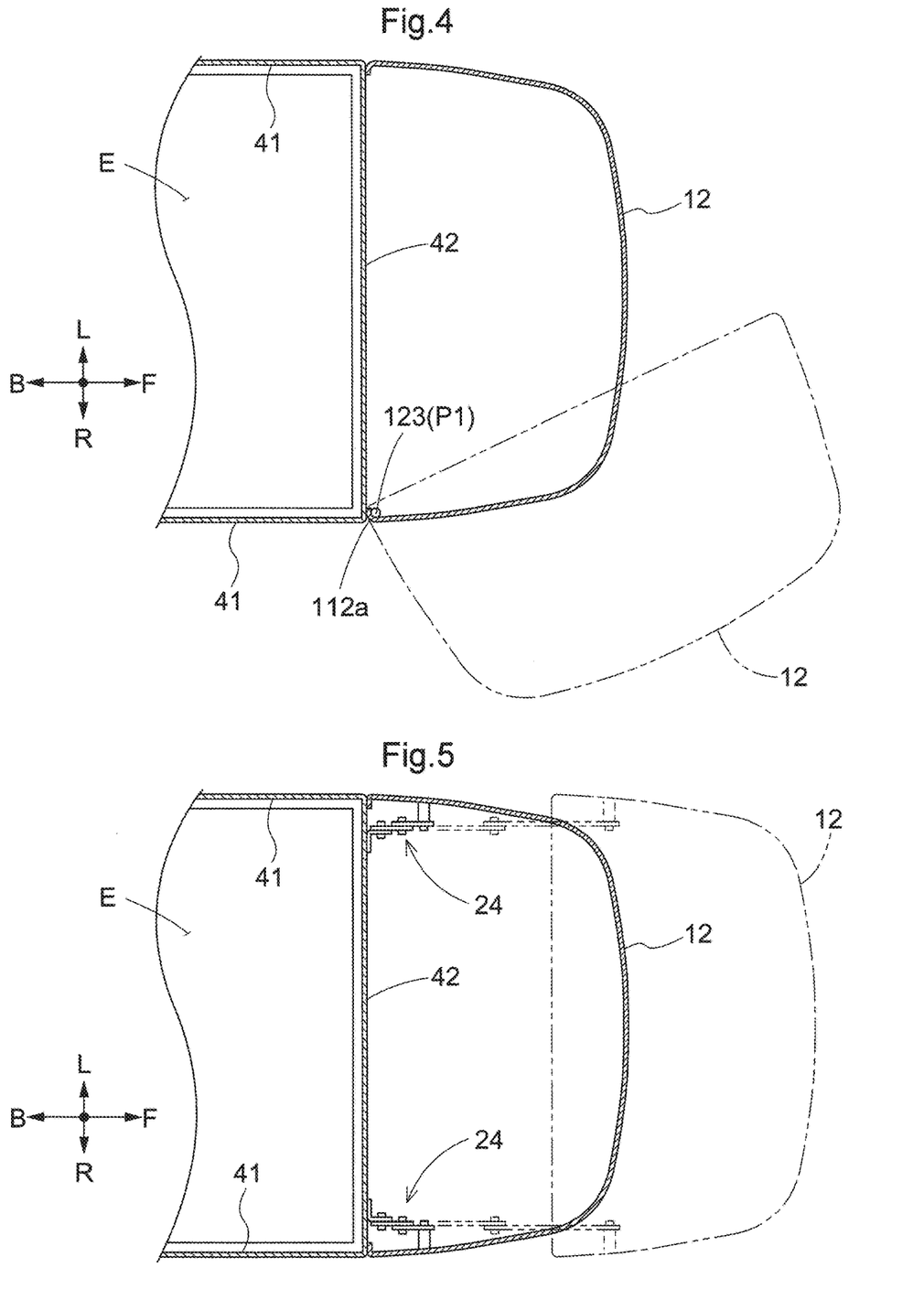
FIG. 4 is a cross-sectional plan view of the configuration of Alternative Preferred Embodiment (3) of the present invention.
FIG. 5 is a cross-sectional plan view of the configuration of Alternative Preferred Embodiment (4) of the present invention.

As illustrated in FIG. 4, the cover 12 may be swingable about a swing axis P1 extending in the up-down direction of the machine body to be opened and closed. FIG. 4 shows a support shaft 123. The support shaft 123 is a bar-shaped member extending in the up-down direction of the machine body, and is supported by the outer wall face of the front wall 42.

The cover 12 illustrated in FIG. 4 includes, at a right back end thereof, an engagement section 112a in the form of a leftward bend. The engagement section 112a is engaged with the support shaft 123, so that the cover 12 is supported by the support shaft 123 in such a manner as to be swingable about the swing axis P1.

As illustrated in FIG. 5, the cover 12 may be slidable relative to the battery cover 40 to be opened and closed. The cover 12 illustrated in FIG. 5 is held by the outer wall surface of the front wall 42 with left and right extending and contracting mechanisms 24 in-between that are capable of extending and contracting in the front-back direction.

With the above configuration, the cover 12 is held by the battery cover 40 in such a manner as to be slidable in the front-back direction relative to the battery cover 40.

The cover 12 may alternatively be slidable in the left-right or up-down direction.

The cover 12 does not necessarily include a back end portion with an outer shape continuous with the outer shape of a front end portion of the battery cover 40. In other words, the cover 12 does not necessarily include an end portion facing the battery cover 40 which end portion has an outer shape continuous with the outer shape of an end portion of the battery cover 40 which faces the cover 12.

Preferred embodiments of the present invention may be arranged, for instance, such that the cover 12 includes a back end portion with an outer shape that is semicircular in a front view, whereas the battery cover 40 includes a front end portion with an outer shape that is rectangular in a front view.

The cover 12 is not necessarily held by the battery cover 40.

The inspection opening cover 46 may be unremovable.
The inspection opening 45 may be absent.
The inspection opening cover 46 may be absent.
The left and right side walls 41 are not necessarily oriented vertically, and may be, for instance, inclined in the left-right direction.

The left and right side walls 41 are not necessarily parallel to each other in a plan view.

Among the left and right front wheels 10 and the left and right rear wheels 11, only the left and right front wheels 10 may be drivable by the motor M, or only the left and right rear wheels 11 may be drivable by the motor M.

The left and right front wheels 10 may be replaced with crawler wheels and belts. In this case, the crawler wheels and belts are an example of the "travel device".

The left and right rear wheels 11 may be replaced with crawler wheels and belts. In this case, the crawler wheels and belts are an example of the "travel device".

The left and right front wheels 10 and the left and right rear wheels 11 may be replaced with crawler wheels and belts. In this case, the crawler wheels and belts are an example of the "travel device".

The tractor A may be a hybrid tractor including an engine as well.

The electricity storage E may, for instance, include a plurality of battery cells. The electricity storage E may be configured in any manner as long as the electricity storage E is capable of storing electric power.

The cover 12 is not necessarily forward of the travel battery 4, and may be backward of the travel battery 4, for example.

The cover 12 and the travel battery 4 are not necessarily adjacent to each other. The cover 12 and the travel battery 4 may, for instance, be separated from each other by another cover as part of the exterior or a frame member.

Preferred embodiments of the present invention are applicable to not only tractors but also various electric work vehicles such as combines, rice transplanters, and construction machines.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An electric work vehicle, comprising:
   a driver section that an operator is able to enter;
   a battery forward of the driver section;
   a motor drivable on electric power supplied by the battery;
   a travel device drivable by the motor; and
   a cover including an accommodation space inside and capable of being opened and closed; wherein
   the battery includes:
      an electricity storage to store electric power; and
      a battery cover hermetically accommodating the electricity storage;
   the battery cover includes an outer wall surface defining a portion of an exterior of the electric work vehicle; and
   the accommodation space included in the cover is adjacent to and in front of the battery cover.

2. The electric work vehicle according to claim 1, wherein the cover is adjacent to the battery; and
   the cover includes an end portion facing the battery cover which end portion includes an outer shape continuous with an outer shape of an end portion of the battery cover which end portion faces the cover.

3. The electric work vehicle according to claim 2, wherein the cover is held by the battery cover.

4. The electric work vehicle according to claim 1, wherein the cover is swingable about a swing axis extending in a left-right direction of a machine body to be opened and closed.

5. The electric work vehicle according to claim 1, wherein the cover is swingable about a swing axis extending in an up-down direction of a machine body to be opened and closed.

6. The electric work vehicle according to claim 1, wherein the cover is slidable relative to the battery cover to be opened and closed.

7. The electric work vehicle according to claim 1, wherein the battery cover includes an inspection opening allowing communication between an inside and outside of the battery cover, and includes an inspection opening cover capable of exposing and closing the inspection opening.

8. The electric work vehicle according to claim 1, wherein the battery cover includes a left side wall and a right side wall; and
   the left side wall and the right side wall are oriented vertically or substantially vertically, and are parallel or substantially parallel to each other in a plan view.

* * * * *